US012774357B2

(12) United States Patent
Jean-Baptiste-Dit-Dominique et al.

(10) Patent No.: US 12,774,357 B2
(45) Date of Patent: Oct. 27, 2026

(54) FUNCTIONAL COPOLYMER OF A 1,3-DIENE AND ETHYLENE OR A 1,3-DIENE, ETHYLENE AND AN α-MONOOLEFIN

(71) Applicant: COMPAGNIE GENERALE DES ETABLISSEMENTS MICHELIN, Clermont-Ferrand (FR)

(72) Inventors: François Jean-Baptiste-Dit-Dominique, Clermont-Ferrand Cedex (FR); Robert Ngo, Clermont-Ferrand Cedex (FR); Julien Thuilliez, Clermont-Ferrand Cedex (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 526 days.

(21) Appl. No.: 18/288,438

(22) PCT Filed: Apr. 11, 2022

(86) PCT No.: PCT/FR2022/050672

§ 371 (c)(1),
(2) Date: Oct. 26, 2023

(87) PCT Pub. No.: WO2022/229536

PCT Pub. Date: Nov. 3, 2022

(65) Prior Publication Data

US 2024/0218104 A1 Jul. 4, 2024

(30) Foreign Application Priority Data

Apr. 29, 2021 (FR) ...................................... 2104475

(51) Int. Cl.

| | |
|---|---|
| ***C08F 236/06*** | (2006.01) |
| ***C08F 2/06*** | (2006.01) |
| ***C08F 4/54*** | (2006.01) |
| ***C08F 4/654*** | (2006.01) |
| ***C08F 210/02*** | (2006.01) |
| ***C08F 210/14*** | (2006.01) |

(52) U.S. Cl.
CPC .............. *C08F 236/06* (2013.01); *C08F 2/06* (2013.01); *C08F 4/545* (2013.01); *C08F 4/6546* (2013.01); *C08F 210/02* (2013.01); *C08F 210/14* (2013.01); *C08F 2420/00* (2013.01); *C08F 2438/00* (2013.01); *C08F 2810/40* (2013.01)

(58) Field of Classification Search
CPC .......... C08F 4/52; C08F 4/545; C08F 4/6546; C08F 2810/40; C08F 2420/00; C08F 210/02; C08F 230/06; C08F 220/14; C08F 230/08; C08F 236/22; C08F 230/085
See application file for complete search history.

(56) References Cited

U.S. PATENT DOCUMENTS

| | | | |
|---|---|---|---|
| 5,166,274 A | 11/1992 | McGrath et al. | |
| 5,312,881 A | 5/1994 | Marks et al. | |
| 5,527,751 A * | 6/1996 | Inamatsu | C08F 297/06 526/140 |
| 6,160,048 A * | 12/2000 | Uyeda | C08F 8/00 525/308 |
| 2010/0022725 A1 | 1/2010 | Thuilliez et al. | |
| 2014/0200313 A1 | 7/2014 | Chenal et al. | |
| 2023/0013682 A1 * | 1/2023 | Moreso | B60C 1/00 |

FOREIGN PATENT DOCUMENTS

| | | | |
|---|---|---|---|
| EP | 2266819 | A1 | 12/2010 |
| FR | 2893028 | A1 | 5/2007 |
| WO | 0102446 | A1 | 1/2001 |
| WO | 03046066 | A1 | 6/2003 |
| WO | 2007054223 | A2 | 5/2007 |
| WO | 2007054224 | A2 | 5/2007 |
| WO | 2013014383 | A1 | 1/2013 |
| WO | 2013135314 | A1 | 9/2013 |
| WO | 2016092227 | A1 | 6/2016 |
| WO | 2016092237 | A1 | 6/2016 |
| WO | 2017093654 | A1 | 6/2017 |
| WO | 2017097831 | A1 | 6/2017 |
| WO | 2018020122 | A1 | 2/2018 |
| WO | 2021053295 | A1 | 3/2021 |

OTHER PUBLICATIONS

Thuilliez, et al., Macromolecules, vol. 42, No. 11, 2009, 3774-3779, 2009 American Chemical Society, Published on Web Apr. 20, 2009, Palaiseau, France.
"Advanced Organic Chemistry" by J. March, 4th Edition, 1992, pp. 622-623, A Wiley-Interscience Publication, John Wiley & Sons, ISBN 0-471-60180-2, United States of America.
Handbook of Grignard Reagents, edited by Gary S. Silverman and Philip E. Rakita, 1996, pp. 502-503, British Library Jun. 12, 2023.

* cited by examiner

*Primary Examiner* — Fred M Teskin
(74) *Attorney, Agent, or Firm* — Dickinson Wright PLLC

(57) ABSTRACT

A copolymer of a 1,3-diene and of an olefin is provided. The copolymer bears, at one of its chain ends, a functional group of formula —$CH_2$—$CH(CH_3)$—COOZ, Z being a hydrogen atom or a carbon-comprising group. A process of preparation of the copolymer is also provided. The olefin is ethylene or a mixture of ethylene and of an α-monoolefin.

15 Claims, No Drawings

FUNCTIONAL COPOLYMER OF A 1,3-DIENE AND ETHYLENE OR A 1,3-DIENE, ETHYLENE AND AN α-MONOOLEFIN

This U.S. patent application is a national phase entry of international patent application no. PCT/FR2022/050672, filed Apr. 11, 2022, which claims priority to French patent application no. FR2104475, filed Apr. 29, 2021, the entire contents of which are incorporated herein by reference in their entirety.

BACKGROUND

1. Technical Field

The field of the invention is that of processes for the functionalization at the chain end of copolymers of a 1,3-diene and ethylene and optionally of an α-monoolefin.

2. Related Art

It is always advantageous to have available new polymers to broaden the range of materials already available and to improve the functionalities of the materials already existing. Mention may be made, among the access routes to new polymers, of the modification of polymers.

The modification of a polymer at one of its chain ends can proceed from a simple functionalization of the polymer by a functional group or else proceed from an insertion of a block of a second polymer at the chain end of the polymer to be modified. The modification of a hydrocarbon polymer by insertion of a block of a second polar polymer generally has the consequence of drastically modifying the backbone of the hydrocarbon polymer and consequently its properties, in particular its rheological and thermal properties. This is why the modification by functionalization of a hydrocarbon polymer by a polar functional group at the chain end may be favoured to preserve some of the intrinsic properties of the hydrocarbon polymer, the polar functional group not being a polymer block.

The introduction of a functional group, in particular a polar functional group, at the chain end of a polymer is widely described for polymers synthesized by anionic polymerization. The functionalization of the ends of the polymer chains produced by anionic polymerization is based on the living nature of the polymer chains, the living nature being expressed by the absence of transfer reaction and termination reaction during the polymerization reaction. Living polymerization is also characterized by the fact that a single polymer chain is produced per mole of initiator or of metal.

On the other hand, the functionalization at the chain end of polymers containing diene units and ethylenic units which are prepared by polymerization by means of a coordination catalytic system comprising a metallocene and a cocatalyst, such as an organomagnesium compound, has not been extensively described. One of the reasons originates from the polymerization reaction mechanism, which involves numerous transfer reactions between the metal of the metallocene and the magnesium of the cocatalyst during the polymerization reaction, and also the production of a large number of copolymer chains per metallocene metal atom.

To modify such polymers at the end of the chain in a quasiquantitative manner, processes specific to this polymerization chemistry have been developed.

For example, it has been proposed to use functional transfer agents instead of cocatalysts. These functional transfer agents described in Patent Applications WO 2016/092237 and WO 2013/135314 are, for example, organomagnesium compounds which carry an amine, ether or vinyl function. As transfer agents are generally not commercially available products and comprise a carbon-metal bond, their use requires their bespoke synthesis, as well as storage and handling precautions.

To modify the chain end of the polymers synthesized by polymerization by means of a coordination catalytic system comprising a metallocene, it has also been proposed to introduce a block of a second polymer by subsequent polymerization of another monomer. Mention may be made, among the other monomers which can be polymerized by means of a coordination catalytic system comprising a metallocene, of the methacrylates, as is described in Patent Application U.S. Pat. No. 5,312,881. Reference may be made, by way of illustration of a polymer synthesized by polymerization by means of a coordination catalytic system comprising a metallocene and modified at the chain end by the introduction of a block of a polymethacrylate, to Patent Application WO 2013/014383 A1. The patent application describes, for example, the modification of a polyethylene at the chain end by subsequent polymerization of methyl methacrylate to the polymerization of ethylene by means of a catalytic system composed of di(n-hexyl)magnesium and the reaction product of neodymium borohydride and pentamethylcyclopentadiene. The modification reaction takes place in a solvent mixture of toluene and tetrahydrofuran. Nevertheless, the introduction of a block of a second polymer at the chain end of a polymer can modify the intrinsic properties of the copolymer containing diene units and ethylenic units, such as, for example, its glass transition temperature.

SUMMARY

Continuing its efforts to modify at the chain end copolymers containing diene and ethylenic units, the applicant company has developed a new, relatively simple, functionalization process, since it resorts to functionalization agents which are readily accessible and storable, methacrylates, without there being formation of a polymethacrylate block.

Thus, a first subject-matter of the invention is a process for the preparation of a copolymer of a 1,3-diene and of an olefin, the copolymer bearing, at one of its chain ends, a functional group of formula $—CH_2—CH(CH_3)—COOZ$, Z being a hydrogen atom or a carbon-comprising group, which process comprises the successive stages a), b) and c) and, if appropriate, a stage d), stage a) being the polymerization of a monomer mixture containing a 1,3-diene and an olefin in the presence of a catalytic system based at least on a metallocene of formula (Ia) and on an organomagnesium compound $$\{P(Cp^1)(Cp^2)Nd(BH_4)_{(1+y)}—L_y—N_x\} \quad (Ia)$$

$Cp^1$ and $Cp^2$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, Nd denoting a neodymium atom, L representing an alkali metal selected from the group consisting of lithium, sodium and potassium, N representing a molecule of an ether, x, which is or is not an integer, being equal to or greater than 0, y, which is an integer, being equal to or greater than 0, the olefin being ethylene or a mixture of ethylene and of an α-monoolefin, stage b) being the reaction of a methacrylate with the reaction product of the polymerization of stage a), stage c) being a chain termination reaction, stage d) being a hydrolysis reaction.

A second subject-matter of the invention is a copolymer which is capable of being obtained by the process in accordance with the invention. The copolymer is a copolymer of a 1,3-diene and of an olefin and bears, at one of its chain ends, a functional group of formula $—CH_2—CH(CH_3)—COOZ$, Z being a hydrogen atom or a carbon-comprising group, the olefin being ethylene or a mixture of ethylene and of an α-monoolefin. The copolymer according to the invention is a copolymer, one chain end of which bears an ester function which derives from a methacrylate, if appropriate hydrolysed, without its intrinsic properties, such as its glass transition temperature, being modified. When the methacrylate used in stage a) is a functional methacrylate, the copolymer in accordance with the invention also has the advantage of bearing two functions at one and the same chain end: the ester function of the methacrylate and the function of the functional methacrylate, if necessary hydrolysed.

DETAILED DESCRIPTION OF EXAMPLE EMBODIMENTS

Any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

In the present account of the invention, the formalism $(C_1-C_3)$alkyl is used to designate an alkyl radical having from 1 to 3 carbon atoms. In the same way, $(C_1-C_2)$alkyl denotes an alkyl radical having from 1 to 2 carbon atoms and $(C_1-C_2)$alkoxy denotes an alkoxy radical having from 1 to 2 carbon atoms.

The compounds mentioned in the description can be of fossil origin or can be biobased. In the latter case, they can partially or completely result from biomass or be obtained from renewable starting materials resulting from biomass. In the same way, the compounds mentioned can also originate from the recycling of pre-used materials, that is to say that they can, partially or completely, result from a recycling process, or also be obtained from starting materials which themselves result from a recycling process.

The expression "based on" used to define the constituents of the catalytic system is understood to mean the mixture of these constituents, or the product of the reaction of a portion or of all of these constituents with one another.

The purpose of the process in accordance with the invention is to prepare a copolymer which bears a functional group covalently attached to one of the chain ends of the copolymer, the copolymer being a copolymer of a 1,3-diene and of ethylene or a copolymer of a 1,3-diene, of ethylene and of an α-monoolefin. The term "α-monoolefin" is understood to mean an α-olefin which has a single carbon-carbon double bond, the double bonds in aromatic compounds not being taken into account. For example, styrene is regarded as an α-monoolefin.

Stage a) of the process in accordance with the invention is a polymerization reaction of a monomer mixture of a 1,3-diene and of an olefin which makes it possible to prepare the copolymer chains of a 1,3-diene and of an olefin, growing chains intended to react in the next stage, stage b), with a functionalization agent, a methacrylate.

The 1,3-diene of the monomer mixture of stage a) is a single compound, that is to say a single (one) 1,3-diene, or a mixture of 1,3-dienes which differ from one another in the chemical structure. 1,3-dienes having from 4 to 20 carbon atoms, such as 1,3-butadiene, isoprene, myrcene, β-farnesene and their mixtures, are suitable as 1,3-diene. The 1,3-diene is preferably 1,3-butadiene, isoprene, myrcene, β-farnesene or their mixtures, in particular a mixture of at least two of them.

According to a first variant of the invention, the olefin of the monomer mixture of stage a) is ethylene. According to this variant, the monomer mixture is a mixture of a 1,3-diene and of ethylene and the reaction product of the polymerization of stage a) is a polymer chain, the constituent units of which result from the insertion of ethylene and of 1,3-diene in the growing chain. The copolymer prepared by this first variant is a copolymer of ethylene and of a 1,3-diene.

According to a second variant of the invention, the monomer mixture of stage a) is a mixture of a 1,3-diene and of an olefin which is itself a mixture of ethylene and of an α-monoolefin. According to this variant, the reaction product of the polymerization of stage a) is a polymer chain, the constituent units of which result from the insertion of ethylene, of the α-monoolefin and of 1,3-diene in the growing chain. The α-monoolefin is preferentially styrene or a styrene, the benzene ring of which is substituted by alkyl groups, more preferentially styrene. The copolymer prepared by a preferential embodiment of the second variant is a copolymer of ethylene, of a 1,3-diene and of styrene.

Preferably, the monomer mixture of stage a) contains more than 50 mol % of ethylene, the percentage being expressed with respect to the total number of moles of monomers of the monomer mixture of stage a). When the monomer mixture contains an α-monoolefin, such as styrene, it preferentially contains less than 40 mol % of the α-monoolefin, the percentage being expressed with respect to the total number of moles of monomers of the monomer mixture of stage a).

The copolymerization of the monomer mixture can be carried out in accordance with Patent Applications WO 2007/054223 A2 and WO 2007/054224 A2 using a catalytic system composed of a metallocene and an organomagnesium compound.

In the present patent application, metallocene is understood to mean an organometallic complex, the metal of which, in the case in point the neodymium atom, is bonded to a molecule referred to as ligand and consisting of two $Cp^1$ and $Cp^2$ groups connected together by a bridge P. These $Cp^1$ and $Cp^2$ groups, which are identical or different, are selected from the group consisting of fluorenyl groups, cyclopentadienyl groups and indenyl groups, it being possible for these groups to be substituted or unsubstituted.

According to the invention, the metallocene used as base constituent in the catalytic system corresponds to the formula (Ia)

$$\{P(Cp^1)(Cp^2)Nd(BH_4)_{(1+y)}—L_y—N_x\} \quad (Ia)$$

P being a group bridging the two groups $Cp^1$ and $Cp^2$ and comprising a silicon or carbon atom, $Cp^1$ and $Cp^2$, which are identical or different, being chosen from the group consisting of fluorenyl groups, cyclopentadienyl groups and indenyl groups, the groups being substituted or unsubstituted, Nd denoting a neodymium atom, L representing an alkali metal selected from the group consisting of lithium, sodium and potassium, N representing a molecule of an ether, x, which is or is not an integer, being equal to or greater than 0, y, which is an integer, being equal to or greater than 0.

Any ether which has the ability to complex the alkali metal, in particular diethyl ether, methyltetrahydrofuran and tetrahydrofuran, is suitable as ether.

Mention may be made, as substituted cyclopentadienyl, fluorenyl and indenyl groups, of those substituted by alkyl radicals having from 1 to 6 carbon atoms or by aryl radicals having from 6 to 12 carbon atoms or also by trialkylsilyl radicals, such as $SiMe_3$. The choice of the radicals is also guided by the accessibility to the corresponding molecules, which are the substituted cyclopentadienes, fluorenes and indenes, because these are commercially available or can be easily synthesized.

Mention may be made, as substituted fluorenyl groups, of those substituted in the 2, 7, 3 or 6 position, particularly 2,7-di(tert-butyl)fluorenyl or 3,6-di(tert-butyl)fluorenyl. The 2, 3, 6 and 7 positions respectively denote the positions of the carbon atoms of the rings as represented in the diagram below, the 9 position corresponding to the carbon atom to which the bridge P is attached.

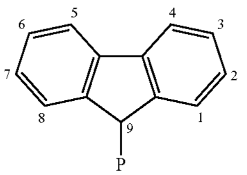

Mention may be made, as substituted cyclopentadienyl groups, of those substituted equally well in the 2 (or 5) position as in the 3 (or 4) position, particularly those substituted in the 2 position, more particularly of the tetramethylcyclopentadienyl group. The 2 (or 5) position denotes the position of the carbon atom which is adjacent to the carbon atom to which the bridge P is attached, as represented in the diagram below. It is recalled that a substitution in the 2 or 5 position is also denoted substitution in the alpha position with respect to the bridge.

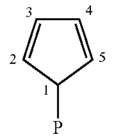

Mention may particularly be made, as substituted indenyl groups, of those substituted in the 2 position, more particularly 2-methylindenyl or 2-phenylindenyl. The 2 position denotes the position of the carbon atom which is adjacent to the carbon atom to which the bridge P is attached, as represented in the diagram below.

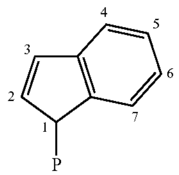

Preferably, $Cp^1$ and $Cp^2$, which are identical or different, are cyclopentadienyls substituted in the alpha position with respect to the bridge, substituted fluorenyls, substituted indenyls or fluorenyl of formula $C_{13}H_9$ or else indenyl of formula $C_9H_7$. More preferentially, $Cp^1$ and $Cp^2$, which are identical or different, are selected from the group consisting of substituted fluorenyl groups and the unsubstituted fluorenyl group of formula $C_{13}H_9$. Advantageously, $Cp^1$ and $Cp^2$ are identical and each represent an unsubstituted fluorenyl group of formula $C_{13}H_9$, represented by the symbol Flu.

Preferably, the bridge P connecting the groups $Cp^1$ and $Cp^2$ is of formula $ZR^1R^2$, in which Z represents a silicon or carbon atom and $R^1$ and $R^2$, which are identical or different, each represent an alkyl group comprising from 1 to 20 carbon atoms, preferably a methyl. In the formula $ZR^1R^2$, Z advantageously represents a silicon atom, Si.

Better still, the metallocene is of formula (I-1), (I-2), (I-3), (I-4) or (I-5):

$$[Me_2Si(Flu)_2Nd(\mu\text{-}BH_4)_2Li(THF)] \quad (I\text{-}1)$$

$$[\{Me_2SiFlu_2Nd(\mu\text{-}BH_4)_2Li(THF)\}_2] \quad (I\text{-}2)$$

$$[Me_2SiFlu_2Nd(\mu\text{-}BH_4)_2Li(THF)] \quad (I\text{-}3)$$

$$[\{Me_2SiFlu_2Nd(\mu\text{-}BH_4)_2Li(THF)\}_2] \quad (I\text{-}4)$$

$$[Me_2SiFlu_2Nd(\mu\text{-}BH_4)] \quad (I\text{-}5)$$

in which Flu represents the $C_{13}H_9$ group.

The metallocene of use in the synthesis of the catalytic system can be in the form of a crystalline or non-crystalline powder, or also in the form of single crystals. The metallocene can be provided in a monomer or dimer form, these forms depending on the method of preparation of the metallocene, as is described, for example, in Patent Application WO 2007/054224 A2 or WO 2007/054223 A2. The metallocene can be prepared conventionally by a process analogous to that described in Patent Application WO 2007/054224 A2 or WO 2007/054223 A2, in particular by reaction, under inert and anhydrous conditions, of the salt of an alkali metal of the ligand with a borohydride of the rare earth metal neodymium in a suitable solvent, such as an ether, for example diethyl ether or tetrahydrofuran, or any other solvent known to a person skilled in the art. After reaction, the metallocene is separated from the reaction by-products by techniques known to a person skilled in the art, such as filtration or precipitation from a second solvent. The metallocene is finally dried and isolated in solid form.

The organomagnesium compound, the other base constituent of the catalytic system, is the co-catalyst of the catalytic system. Typically, the organomagnesium compound can be a diorganomagnesium compound or a halide of an organomagnesium compound. Preferably, the organomagnesium compound is of formula (IIa), (IIb), (IIc) or (IId) in which $R^3$, $R^4$, $R^5$ and $R^B$, which are identical or different, represent a carbon-comprising group, $R^A$ represents a divalent carbon-comprising group, X is a halogen atom and m is a number greater than or equal to 1, preferably equal to 1.

$$MgR^3R^4 \quad \text{(IIa)}$$

$$XMgR^5 \quad \text{(IIb)}$$

$$R^B—(Mg—R^A)_m—Mg—R^B \quad \text{(IIc)}$$

$$X—Mg—R^A—Mg—X. \quad \text{(IId)}$$

$R^A$ can be a divalent aliphatic hydrocarbon chain, interrupted or not interrupted by one or more oxygen or sulfur atoms or else by one or more arylene groups.

Carbon-comprising group is understood to mean a group which contains one or more carbon atoms. The carbon-comprising group can be a hydrocarbon group (hydrocarbyl group) or else a heterohydrocarbon group, that is to say a group comprising, in addition to the carbon and hydrogen atoms, one or more heteroatoms. The compounds described as transfer agents in Patent Application WO 2016/092227 A1 may be suitable as organomagnesium compounds having a heterohydrocarbon group. The carbon-comprising group represented by the symbols $R^3$, $R^4$, $R^5$, $R^B$ and $R^A$ are preferentially hydrocarbon groups.

Preferably, $R^A$ contains from 3 to 10 carbon atoms, in particular from 3 to 8 carbon atoms.

Preferably, $R^A$ is a divalent hydrocarbon chain. Preferably, $R^A$ is a linear or branched alkanediyl, a cycloalkanediyl or a xylenediyl. More preferentially, $R^A$ is an alkanediyl. More preferentially still, $R^A$ is an alkanediyl having from 3 to 10 carbon atoms. Advantageously, $R^A$ is an alkanediyl having from 3 to 8 carbon atoms. Very advantageously, $R^A$ is a linear alkanediyl. 1,3-Propanediyl, 1,4-butanediyl, 1,5-pentanediyl, 1,6-hexanediyl, 1,7-heptanediyl and 1,8-octanediyl are very particularly suitable as $R^A$ group.

The carbon-comprising groups represented by $R^3$, $R^4$, $R^5$ or $R^B$ can be aliphatic or aromatic. They can contain one or more heteroatoms, such as an oxygen, nitrogen, silicon or sulfur atom. Preferably, they are alkyls, phenyls or aryls. They can contain from 1 to 20 carbon atoms.

The alkyls represented by $R^3$, $R^4$, $R^5$ or $R^B$ can contain from 2 to 10 carbon atoms and are in particular ethyl, butyl or octyl.

The aryls represented by $R^3$, $R^4$, $R^5$ or $R^B$ can contain from 7 to 20 carbon atoms and are in particular a phenyl substituted by one or more alkyls, such as methyl, ethyl or isopropyl.

$R^3$, $R^4$ and $R^5$ are preferentially alkyls containing from 2 to 10 carbon atoms, phenyls or aryls containing from 7 to 20 carbon atoms.

According to a specific embodiment of the invention, $R^3$ comprises a benzene nucleus substituted by a magnesium atom, one of the carbon atoms of the benzene nucleus ortho to the magnesium being substituted by a methyl, an ethyl or an isopropyl or forming a ring with the carbon atom which is its closest neighbour and which is meta to the magnesium, the other carbon atom of the benzene nucleus ortho to the magnesium being substituted by a methyl, an ethyl or an isopropyl, and $R^4$ is an alkyl. According to this specific embodiment, $R^3$ is advantageously 1,3-dimethylphenyl, 1,3-diethylphenyl, mesityl or 1,3,5-triethylphenyl and $R^4$ is advantageously ethyl, butyl or octyl.

According to another specific embodiment of the invention, $R^3$ and $R^4$ are alkyls containing from 2 to 10 carbon atoms, in particular ethyl, butyl or octyl.

Preferably, $R^5$ is an alkyl containing from 2 to 10 carbon atoms, in particular ethyl, butyl or octyl.

Advantageously, $R^B$ comprises a benzene nucleus substituted by the magnesium atom, one of the carbon atoms of the benzene nucleus ortho to the magnesium being substituted by a methyl, an ethyl or an isopropyl or forming a ring with the carbon atom which is its closest neighbour and which is meta to the magnesium, the other carbon atom of the benzene nucleus ortho to the magnesium being substituted by a methyl, an ethyl or an isopropyl. Better still, $R^B$ is 1,3-dimethylphenyl, 1,3-diethylphenyl, mesityl or 1,3,5-triethylphenyl.

Suitable as organomagnesium compound are, for example, butylethylmagnesium, butyloctylmagnesium, ethylmagnesium chloride, butylmagnesium chloride, ethylmagnesium bromide, butylmagnesium bromide, octylmagnesium chloride, octylmagnesium bromide, 1,3-dimethylphenylbutylmagnesium, 1,3-diethylphenylethylmagnesium, butylmesitylmagnesium, ethylmesitylmagnesium, 1,3-diethylphenylbutylmagnesium, 1,3-diethylphenylethylmagnesium, 1,3-diisopropylphenylbutylmagnesium, 1,3-diisopropylphenylethylmagnesium, 1,3,5-triethylphenylbutylmagnesium, 1,3,5-triethylphenylethylmagnesium, 1,3,5-triisopropylphenylbutylmagnesium, 1,3,5-triisopropylphenylethylmagnesium, 1,3-di(magnesium bromide)propanediyl, 1,3-di(magnesium chloride)propanediyl, 1,5-di(magnesium bromide)pentanediyl, 1,5-di(magnesium chloride)pentanediyl, 1,8-di(magnesium bromide)octanediyl and 1,8-di(magnesium chloride)octanediyl.

The organomagnesium compound of formula (IIc) can be prepared by a process which comprises the reaction of a first organomagnesium compound of formula $X'Mg—R^A—MgX'$ with a second organomagnesium compound of formula $R^B—Mg—X'$, X' representing a halogen atom, preferentially a bromine or chlorine atom, and $R^B$ and $R^A$ being as defined above. X' is more preferentially a bromine atom. The stoichiometry used in the reaction determines the value of m in formula (IIc). For example, a molar ratio of 0.5 of the amount of the first organomagnesium compound to the amount of the second organomagnesium compound is favourable to the formation of an organomagnesium compound of formula (IIc) in which m is equal to 1, whereas a molar ratio of greater than 0.5 will be more favourable to the formation of an organomagnesium compound of formula (IIc) in which m is greater than 1.

In order to carry out the reaction of the first organomagnesium compound with the second organomagnesium compound, a solution of the second organomagnesium compound is typically added to a solution of the first organomagnesium compound. The solutions of the first organomagnesium compound and of the second organomagnesium compound are generally solutions in an ether, such as diethyl ether, dibutyl ether, tetrahydrofuran, methyltetrahydrofuran or a mixture of two or more of these ethers. Preferably, the respective concentrations of the solutions of the first organomagnesium compound and of the second organomagnesium compound are from 0.01 to 3 mol/1 and from 0.02 to 5 mol/1 respectively. More preferentially, the respective concentrations of the first organomagnesium compound and of the second organomagnesium compound are from 0.1 to 2 mol/1 and from 0.2 to 4 mol/1 respectively.

The first organomagnesium compound and the second organomagnesium compound can be prepared beforehand by a Grignard reaction starting from magnesium metal and from a suitable precursor in a reactor. For the first organomagnesium compound and the second organomagnesium compound, the respective precursors are of formulae X'—$R^A$—X' and $R^B$—X', $R^A$, $R^B$ and X' being as defined above. The Grignard reaction is typically carried out by the addition of the precursor to magnesium metal, which is generally provided in the form of turnings. Preferably, iodine ($I_2$), typically in the bead form, is introduced into the reactor before the addition of the precursor in order to activate the Grignard reaction in a known way.

Alternatively, the organomagnesium compound of formula (IIc) can be prepared by reaction of an organometallic compound of formula M-$R^A$-M and of the organomagnesium compound of formula $R^B$—Mg—X', M representing a lithium, sodium or potassium atom and X', $R^B$ and $R^A$ being as defined above. Preferably, M represents a lithium atom, in which case the organometallic compound of formula M-$R^A$-M is an organolithium compound.

The reaction of the organolithium compound and of the organomagnesium compound is typically carried out in an ether, such as diethyl ether, dibutyl ether, tetrahydrofuran or methyltetrahydrofuran, methylcyclohexane, toluene or their mixture. The reaction is also typically carried out at a temperature ranging from 0° C. to 60° C. The operation of bringing into contact is preferably carried out at a temperature of between 0° C. and 23° C. The operation of bringing the organometallic compound of formula M-$R^A$-M into contact with the organomagnesium compound of formula $R^B$—Mg—X' is preferentially carried out by addition of a solution of the organometallic compound M-$R^A$-M to a solution of the organomagnesium compound $R^B$—Mg—X'. The solution of the organometallic compound M-$R^A$-M is generally a solution in a hydrocarbon solvent, preferably n-hexane, cyclohexane or methylcyclohexane, and the solution of the organomagnesium compound $R^B$—Mg—X' is generally a solution in an ether, preferably diethyl ether or dibutyl ether. Preferably, the respective concentrations of the solutions of the organometallic compound and of the organomagnesium compound M-$R^A$-M and $R^B$—Mg—X' are from 0.01 to 1 mol/1 and from 0.02 to 5 mol/1 respectively. More preferentially, the respective concentrations of the solutions of the organometallic compound and of the organomagnesium compound M-$R^A$-M and $R^B$—Mg—X' are from 0.05 to 0.5 mol/1 and from 0.2 to 3 mol/1 respectively.

As with any synthesis carried out in the presence of organometallic compounds, the syntheses described for the synthesis of the organomagnesium compounds take place under anhydrous conditions under an inert atmosphere, in stirred reactors. Typically, the solvents and the solutions are used under anhydrous nitrogen or argon.

Once the organomagnesium compound of formula (IIc) has been formed, it is generally recovered in solution after filtration carried out under an inert and anhydrous atmosphere. It can be stored before its use in its solution in sealed containers, for example capped bottles, at a temperature of between −25° C. and 23° C.

The compounds of formula (IId), which are Grignard reagents, are described, for example, in the work "Advanced Organic Chemistry" by J. March, 4th Edition, 1992, pages 622-623, or in the work "Handbook of Grignard Reagents", edited by Gary S. Silverman and Philip E. Rakita, 1996, pages 502-503. They can be synthesized by placing magnesium metal in contact with a dihalogenated compound of formula X—$R^A$—X, $R^A$ being as defined according to the invention. For their synthesis, reference may be made, for example, to the collection of volumes of "Organic Synthesis".

The compounds of formulae (IIa) and (IId), which are also Grignard reagents, are well known; some of them are even commercial products. For their synthesis, reference may also be made, for example, to the collection of volumes of "Organic Synthesis".

Like any organomagnesium compound, the organomagnesium compound constituting the catalytic system, in particular of formula (IIa), (IIb), (IIc) or (IId), can be provided in the form of a monomer entity or in the form of a polymer entity. By way of illustration, the organomagnesium compound (IIc) can be provided in the form of a monomer entity $(R^B—(Mg—R^A)_m—Mg—R^B)_1$ or in the form of a polymer entity $(R^B—(Mg—R^A)_m—Mg—R^B)_p$, p being an integer greater than 1, in particular a dimer $(R^B—(Mg—R^A)_m—Mg—R^B)_2$, m being as defined above. In the same way, also by way of illustration, the organomagnesium compound of formula (IId) can be provided in the form of a monomer entity $(X—Mg—R^A—Mg—X)_1$ or in the form of a polymer entity $(X—Mg—R^A—Mg—X)_p$, p being an integer greater than 1, in particular a dimer $(X—Mg—R^A—Mg—X)_2$.

Moreover, whether it is in the form of a monomer or polymer entity, the organomagnesium compound can also be provided in the form of an entity coordinated with one or more molecules of a solvent, preferably of an ether, such as diethyl ether, tetrahydrofuran or methyltetrahydrofuran.

In formulae (IIb) and (IId), X is preferentially a bromine or chlorine atom, more preferentially a bromine atom.

According to any one of the embodiments of the invention, the organomagnesium compound is preferably of formula (IIa).

The amounts of co-catalyst and of metallocene reacted are such that the ratio of the number of moles of Mg of the co-catalyst to the number of moles of the rare earth metal of the metallocene, neodymium, preferably ranges from 0.5 to 200, more preferentially from 1 to less than 20. The range of values extending from 1 to less than 20 is in particular more favourable for obtaining copolymers of high molar masses.

According to a first embodiment, the catalytic system can be prepared conventionally by a process analogous to that described in Patent Application WO 2007/054224 A2 or WO 2007/054223 A2. For example, the co-catalyst, in the case in point the organomagnesium compound, and the metallocene are reacted in a hydrocarbon solvent typically at a temperature ranging from 20 to 80° C. for a period of time of between 5 and 60 minutes. The catalytic system is generally prepared in an aliphatic hydrocarbon solvent, such as methylcyclohexane, or an aromatic hydrocarbon solvent, such as toluene, preferably in an aliphatic hydrocarbon solvent, such as methylcyclohexane. Generally, after its synthesis, the catalytic system is used in this form for stage a).

According to a second embodiment, the catalytic system can be prepared by a process analogous to that described in Patent Application WO 2017/093654 A1 or in Patent Application WO 2018/020122 A1: it is said to be of preformed type. For example, the organomagnesium compound and the metallocene are reacted in a hydrocarbon solvent typically at a temperature of from 20 to 80° C. for 10 to 20 minutes, in order to obtain a first reaction product, and a preformation monomer is then reacted with this first reaction product at a temperature ranging from 40 to 90° C. for 1 h to 12 h. The preformation monomer is preferably used according to a (preformation monomer/metal of the metallocene) molar ratio ranging from 5 to 1000, preferentially from 10 to 500. Before its use in polymerization, the catalytic system of preformed type can be stored under an inert atmosphere, in particular at a temperature ranging from −20° C. to ambient temperature (23° C.). According to this second embodiment, the catalytic system of preformed type has, as base constituent, a preformation monomer chosen from 1,3-dienes, ethylene and their mixtures. In other words, the "preformed" catalytic system contains, besides the metallocene and the co-catalyst, a preformation monomer. The 1,3-diene, as preformation monomer, can be 1,3-butadiene, isoprene or also a 1,3-diene of formula $CH_2{=}CR^6{-}CH{=}CH_2$, the symbol $R^6$ representing a hydrocarbon group having from 3 to 20 carbon atoms, in particular myrcene or β-farnesene. The preformation monomer is preferentially 1,3-butadiene.

The catalytic system is typically provided in a solvent which is preferentially the solvent in which it was prepared, and the concentration of rare earth metal, that is to say of neodymium, of metallocene is then within a range extending preferentially from 0.0001 to 0.2 mol/l, more preferentially from 0.001 to 0.03 mol/l.

Like any synthesis carried out in the presence of an organometallic compound, the synthesis of the metallocene, the synthesis of the organomagnesium compound and the synthesis of the catalytic system take place under anhydrous conditions under an inert atmosphere. Typically, the reactions are carried out starting from anhydrous solvents and compounds under anhydrous nitrogen or argon.

The polymerization of the monomer mixture is preferably carried out in solution, continuously or batchwise. The polymerization solvent is typically a hydrocarbon solvent, preferably an aliphatic hydrocarbon solvent. Methylcyclohexane is very particularly suitable as example of aliphatic hydrocarbon solvent. The monomer mixture can be introduced into the reactor containing the polymerization solvent and the catalytic system or, conversely, the catalytic system can be introduced into the reactor containing the polymerization solvent and the monomer mixture. The monomer mixture and the catalytic system can be introduced simultaneously into the reactor containing the polymerization solvent, in particular in the case of a continuous polymerization. The polymerization is typically carried out under anhydrous conditions and in the absence of oxygen, in the optional presence of an inert gas. The polymerization temperature generally varies within a range extending from 40 to 150° C., preferably from 40 to 120° C. A person skilled in the art adapts the polymerization conditions, such as the polymerization temperature, the concentration of each of the reactants or the pressure of the reactor, according to the composition of the monomer mixture, the polymerization reactor, the microstructure and the macrostructure which are desired for the copolymer chain.

The polymerization is preferentially carried out at constant pressure of monomers. A continuous addition of each of the monomers or of one of them can be carried out in the polymerization reactor, in which case the polymerization reactor is a fed reactor. This embodiment is particularly suitable for a statistical incorporation of the monomers. Preferably, the polymerization of stage a) is a statistical polymerization, which is reflected by a statistical incorporation of the monomers of the monomer mixture which is used in stage a).

Once the desired degree of conversion of the monomers is reached in the polymerization reaction of stage a), stage b) is carried out.

Stage b) of the process in accordance with the invention brings together a functionalization agent, a methacrylate, with the reaction product from stage a) in order to introduce a single methacrylate monomer unit at one of the ends of the copolymer chain produced on conclusion of stage a). Stage b) is a functionalization reaction on the chain end of the copolymer without there being subsequent polymerization of the methacrylate. After deactivation of the reactive sites by a termination reaction on the polymer chain (stage c), there is obtained a copolymer of a 1,3-diene and of an olefin bearing, at one of its chain ends, a functional group of formula $-CH_2-CH(CH_3)-COOZ$, Z being a carbon-comprising group.

According to a first alternative, the methacrylate is a methacrylate of formula $CH_2{=}CCH_3COOR$, R being a hydrocarbon group, preferably a saturated hydrocarbon group.

According to a second alternative, the methacrylate is a "functional" methacrylate and is of formula $CH_2{=}CCH_3COOR'$, R' being a hydrocarbon group substituted by a function. The function, a substituent of the hydrocarbon group of the symbol R', is a tertiary amine function, an alkoxysilane function, an ether function, a thioether function, a protected amine function or a protected thiol function. Preferably, R' is a hydrocarbon group substituted by a tertiary amine function, an alkoxysilane function or an ether function.

The hydrocarbon group of the symbols R and R' is preferentially saturated. The number of carbon atoms of the hydrocarbon group of the symbols R and R' is not limited per se. The hydrocarbon group can contain up to 20 carbon atoms. Preferentially, the hydrocarbon group of the symbol R contains from 1 to 8 carbon atoms, more preferentially from 1 to 6 carbon atoms. The hydrocarbon group of the symbol R is advantageously an alkyl. Preferentially, the hydrocarbon group of the symbol R' contains from 1 to 6 carbon atoms, more preferentially from 1 to 3 carbon atoms. Preferentially, the hydrocarbon group of the symbol R' is an alkyl group substituted by said function.

According to the first alternative, the methacrylate is preferentially of formula $CH_2{=}CCH_3COOR$ in which R is an alkyl, an aryl or an aralkyl; in particular, the methacrylate is methyl methacrylate, ethyl methacrylate, n-propyl methacrylate, isopropyl methacrylate, n-butyl methacrylate, isobutyl methacrylate, tert-butyl methacrylate or benzyl methacrylate. An aralkyl is a monovalent radical which derives from an alkyl radical by the replacement of one or more hydrogen atoms by aryl groups. R is more preferentially alkyl.

According to a first embodiment of the second alternative, the methacrylate is of formula $CH_2{=}CCH_3COOR'$ in which R' is an alkyl substituted by a dialkylamino group; in particular, the methacrylate is an N,N-di($C_1$-$C_3$)alkylamino($C_1$-$C_3$)alkyl methacrylate, preferentially 2-(dimethylamino)ethyl methacrylate, 2-(diethylamino)ethyl methacrylate or 2-(diisopropylamino)ethyl methacrylate.

According to a second embodiment of the second alternative, the methacrylate is of formula $CH_2{=}CCH_3COOR'$ in which R' is an alkyl substituted by an alkoxydialkylsilyl group, in particular a ($C_1$-$C_2$)alkoxydi($C_1$-$C_2$)alkylsilyl group, such as methoxydimethylsilyl, methoxydiethylsilyl, ethoxydimethylsilyl or ethoxydiethylsilyl, by a dialkoxyalkylsilyl group, in particular a di($C_1$-$C_2$)alkoxy($C_1$-$C_2$)alkylsilyl group, such as dimethoxymethylsilyl, diethoxymethylsilyl, dimethoxyethylsilyl or diethoxyethylsilyl, or by a trialkoxysilyl group, in particular a tri($C_1$-$C_2$)alkoxysilyl group, such as trimethoxysilyl or triethoxysilyl. According to this second embodiment, the methacrylate is preferentially a ($C_1$-$C_2$)alkoxydi($C_1$-$C_2$)alkylsilyl($C_1$-$C_3$)alkyl methacrylate, such as methoxydimethylsilylmethyl methacrylate, ethoxydimethylsilylmethyl methacrylate, methoxydimethylsilylpropyl methacrylate or ethoxydimethylsilylpropyl methacrylate, a di($C_1$-$C_2$)alkoxy($C_1$-$C_2$)alkylsilyl($C_1$-$C_3$)alkyl methacrylate, such as dimethoxymethylsilylmethyl methacrylate, diethoxymethylsilylmethyl methacrylate, dimethoxymethylsilylpropyl methacrylate or diethoxymethylsilylpropyl methacrylate, or a tri($C_1$-$C_2$)alkoxysilyl($C_1$-$C_3$)alkyl methacrylate, such as trimethoxysilylmethyl methacrylate or 3-(trimethoxysilyl)propyl methacrylate.

According to a third embodiment of the second alternative, the methacrylate is of formula $CH_2{=}CCH_3COOR'$ in which R' is an alkyl group substituted by an ether function; in particular, the methacrylate is 2-ethoxyethyl methacrylate, ethylene glycol methyl ether methacrylate, diethylene glycol butyl ether methacrylate, diethylene glycol methyl ether methacrylate, furfuryl methacrylate or tetrahydrofurfuryl methacrylate.

According to a fourth embodiment of the second alternative, the methacrylate is of formula $CH_2{=}CCH_3COOR'$ in which R' is an alkyl group substituted by a thioether function; in particular, the methacrylate is an alkylthioalkyl methacrylate, such as 2-(methylthio)ethyl methacrylate.

According to a fifth embodiment of the second alternative, the methacrylate is of formula $CH_2{=}CCH_3COOR'$ in which R' is an alkyl group substituted by a protected amine function, namely a protected primary or secondary amine function, for example protected by trialkylsilyl groups, in particular trimethylsilyl groups.

According to a sixth embodiment of the second alternative, the methacrylate is of formula $CH_2{=}CCH_3COOR'$ in which R' is an alkyl group substituted by a protected thiol function, for example protected by trialkylsilyl groups, in particular trimethylsilyl groups.

The second embodiment of the second alternative is very particularly preferred.

The methacrylate is more preferentially an alkoxydialkylsilylalkyl methacrylate, in particular a ($C_1$-$C_2$)alkoxydi($C_1$-$C_2$)alkylsilyl($C_1$-$C_3$)alkyl methacrylate, such as methoxydimethylsilylmethyl methacrylate, ethoxydimethylsilylmethyl methacrylate, methoxydimethylsilylpropyl methacrylate or ethoxydimethylsilylpropyl methacrylate, or a dialkoxyalkylsilylalkyl methacrylate, in particular a di($C_1$-$C_2$)alkoxy($C_1$-$C_2$)alkylsilyl($C_1$-$C_3$)alkyl methacrylate, such as dimethoxymethylsilylmethyl methacrylate, diethoxymethylsilylmethyl methacrylate, dimethoxymethylsilylpropyl methacrylate or diethoxymethylsilylpropyl methacrylate.

The methacrylates of use for the requirements of the invention can be commercial products. These are generally commercially available products. When the methacrylates are packaged in the presence of a stabilizer, as is the case for most commercial methacrylates, they are typically used after removal of the stabilizer, which can be carried out in a well-known manner by distillation or by treatment on alumina columns.

Preferably, stage b) is carried out in an aliphatic hydrocarbon solvent, such as methylcyclohexane. Advantageously, it is carried out in the reaction medium resulting from stage a). It is generally carried out by the addition of the methacrylate to the reaction product from stage a) in its reaction medium with stirring.

Before the addition of the methacrylate, the reactor is preferably degassed and inerted. The degassing of the reactor makes it possible to remove the gaseous residual monomers and also facilitates the addition of the methacrylate to the reactor. The inerting of the reactor, for example with nitrogen, makes it possible not to deactivate the carbon-metal bonds present in the reaction medium and necessary for the functionalization reaction of the copolymer. The methacrylate can be added pure or diluted in a hydrocarbon solvent, preferably an aliphatic hydrocarbon solvent, such as methylcyclohexane. The methacrylate is left in contact with the reaction product from stage a) for the time necessary for the functionalization reaction of the chain end of the copolymer. The functionalization reaction can be typically monitored by chromatographic analysis in order to monitor the consumption of the methacrylate. The functionalization reaction is preferentially carried out at a temperature ranging from 23 to 120° C., for 1 to 60 minutes, with stirring. The functionalization reaction is preferentially carried out with a molar excess of methacrylate, with respect to the number of moles of neodymium and of magnesium. In order to obtain a virtually quantitative functionalization, the molar ratio of the number of moles of the methacrylate to the number of moles of neodymium and of magnesium is greater than 2, in particular greater than 5, more particularly of between 10 and 50.

Once the chain end has been modified, stage b) is followed by stage c).

Stage c), the chain termination reaction, is typically a reaction which makes it possible to deactivate the reactive sites still present in the reaction medium resulting from stage b). In stage c), a chain-terminating agent is brought into contact with the reaction product from stage b), generally in its reaction medium, for example by adding the terminating agent to the reaction medium on conclusion of stage b) or by pouring the reaction medium obtained on conclusion of stage b) onto a solution containing the terminating agent. The terminating agent is generally in stoichiometric excess. The terminating agent is typically a protic compound, a compound which comprises a relatively acidic proton. Mention may be made, by way of terminating agent, of water, carboxylic acids, in particular $C_2$-$C_{18}$ fatty acids, such as acetic acid or stearic acid, aliphatic or aromatic alcohols, such as methanol, ethanol or isopropanol, or phenolic antioxidants. Alternatively, the relatively acidic proton can be a deuterium atom, which makes it possible to label, with an isotope, the unit originating from the 1,2-addition of the methacrylate to the chain end of the copolymer of the 1,3-diene and of the olefin.

After reaction with a protic compound, the process results in a copolymer of a 1,3-diene and of an olefin, the monomers used in stage a). The copolymer is a copolymer, the constituent units of which are those of the 1,3-diene and of the olefin and a chain end of which is covalently bonded to a functional group of formula $—CH_2—CH(CH_3)—COOZ$. When the methacrylate is a non-functional methacrylate, Z is a hydrocarbon group, preferably an alkyl, aryl or aralkyl group, preferentially containing from 1 to 8 carbon atoms, in particular methyl, ethyl, n-propyl, isopropyl, n-butyl, isobutyl or tert-butyl. When the methacrylate is a functional methacrylate, Z is a hydrocarbon group substituted by a tertiary amine function, an alkoxysilane function, an ether function, a thioether function, a protected amine function or a protected thiol function.

Stage d) is an optional stage depending on whether or not it is desired to hydrolyse the ester function of the non-functional methacrylate or to hydrolyse the alkoxysilane function, the ether function, the protected amine function or the protected thiol function by which the hydrocarbon group of the functional methacrylate is substituted. Stage d) is typically a hydrolysis reaction of the ester function of the functional group or of the function by which the hydrocarbon group of R' is substituted.

When stage d) is a hydrolysis reaction of the ester function, the ester function is hydrolysed to give the carboxylic acid function and the process thus results in a copolymer of the 1,3-diene and of the olefin bearing, at the chain end, a functional group of formula $—CH_2—CH(CH_3)—COOH$. When a hydrolysis reaction of the ester function is carried out, the methacrylate is preferentially tert-butyl methacrylate. The hydrolysis reaction of the ester function to give a carboxylic acid can be carried out by treatment of the copolymer in solution with a solution of para-toluenesulfonic acid in tetrahydrofuran, followed by steam distillation, an operation commonly known under the term stripping, carried out under consequently acidic conditions, as described, for example, in Patent Application WO 03046066 A1.

When stage d) is a hydrolysis reaction of the alkoxysilane function to give a silanol function, the process results in a copolymer of the 1,3-diene and of the olefin bearing, at the chain end, a functional group of formula $—CH_2—CH(CH_3)—COOZ$, Z being a hydrocarbon group substituted by a silanol function. The hydrolysis reaction of the alkoxysilane function to give a silanol function can be carried out by treatment of the copolymer in solution with aqueous hydrochloric acid, followed by stripping, for example according to the conditions described in Patent Application EP 2 266 819 A1.

When stage d) is a hydrolysis reaction of the ether function to give an alcohol function, typically there is used a trimethylsilyl halide, such as trimethylsilyl iodide, known for catalysing the hydrolysis of ethers to give alcohols under mild conditions, and the process then results in a copolymer of the 1,3-diene and of the olefin bearing, at the chain end, a functional group of formula $—CH_2—CH(CH_3)—COOZ$, Z being a hydrocarbon group substituted by an alcohol function.

When stage d) is a hydrolysis reaction to deprotect a protected amine or thiol function, for example protected by a trimethylsilyl group, the hydrolysis reaction can be carried out in an acidic or preferentially basic medium, for example under the conditions described in Patent Application WO 2017/097831 A1.

The copolymer prepared according to the process in accordance with the invention can be separated from the reaction medium of stage c) or d) according to processes well known to a person skilled in the art, for example by an operation of evaporation of the solvent under reduced pressure or by a steam stripping operation.

The copolymer, another subject-matter of the invention, is a copolymer which can be prepared by the process in accordance with the invention.

The copolymer in accordance with the invention has the essential characteristic of being a copolymer of a 1,3-diene and of an olefin. The olefin is ethylene or a mixture of ethylene and of an α-monoolefin. The constituent units of the copolymer are those which result from the polymerization of the 1,3-diene and of the olefin. In the case where the olefin is ethylene, the constituent units are those resulting from the polymerization of the 1,3-diene and of ethylene and the copolymer is a copolymer of ethylene and of a 1,3-diene. In the case where the olefin is a mixture of ethylene and an α-monoolefin, the constituent units are those resulting from the polymerization of the 1,3-diene, of ethylene and of the α-monoolefin and the copolymer is a copolymer of ethylene, of a 1,3-diene and of an α-monoolefin. Preferably, the α-monoolefin is styrene.

The 1,3-diene is a single compound, that is to say a single (one) 1,3-diene, or a mixture of 1,3-dienes which differ from one another in the chemical structure. 1,3-Dienes having from 4 to 20 carbon atoms are suitable as 1,3-diene. Preferably, the copolymer is a statistical copolymer of the 1,3-diene and of the olefin. Such a copolymer can be prepared by the process in accordance with the invention according to the mode in which the polymerization reaction is carried out at constant pressure of monomers and a continuous addition of each of the monomers or of one of them is carried out in the polymerization reactor.

Preferably, the 1,3-diene is 1,3-butadiene, isoprene, myrcene, β-farnesene or their mixtures, such as a mixture of at least two of them. The mixture of at least two of them is advantageously a mixture which contains 1,3-butadiene.

According to a specific embodiment of the invention, the 1,3-diene is a mixture of 1,3-dienes which contains 1,3-butadiene.

According to another particularly preferential embodiment of the invention, the copolymer in accordance with the invention contains 1,3-butadiene units and cyclic units, 1,2-cyclohexane units. The 1,2-cyclohexane units are of formula (I). The cyclic units result from a specific insertion of ethylene and 1,3-butadiene monomers into the polymer chain, in addition to the conventional ethylene and 1,3-butadiene units, respectively $—(CH_2—CH_2)—$, $—(CH_2—CH=CH—CH_2)—$ and $—(CH_2—CH(C=CH_2))—$. The mechanism for obtaining such a microstructure is described, for example, in Macromolecules, 2009, 42, 3774-3779.

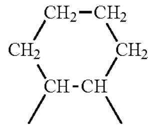

(I)

When the polymer in accordance with the invention contains 1,2-cyclohexane units, it preferentially contains at most 15 mol % thereof, the percentage being expressed with respect to all of the units resulting from the polymerization of the 1,3-diene and of the olefin. Such a copolymer can be prepared by the process in accordance with the invention according to the mode in which the metallocene of the catalytic system has, as ligand, two substituted or unsubstituted fluorenyl groups.

Preferably, the copolymer contains more than 50 mol % of ethylene unit, the percentage being expressed with respect to all of the units resulting from the polymerization of the 1,3-diene and of the olefin.

The copolymer in accordance with the invention also has, as other characteristic, that of bearing, at one of its chain ends, a functional group of formula $—CH_2—CH(CH_3)—COOZ$. The functional group is covalently attached to the chain end of the copolymer. In other words, the methylene $(CH_2)$ of the functional group is covalently bonded to a carbon atom of a constituent unit of the copolymer of a 1,3-diene and of an olefin.

According to a first variant of the invention, the functional group borne at the chain end by the copolymer of a 1,3-diene and of an olefin is of formula —$CH_2$—$CH(CH_3)$—COOZ, Z being a hydrogen atom or a hydrocarbon group which is preferably saturated.

The number of carbon atoms of the hydrocarbon group represented by Z is not limited per se. The hydrocarbon group represented by Z can contain up to 20 carbon atoms. Preferentially, it contains from 1 to 8 carbon atoms, more preferentially from 1 to 6 carbon atoms. It is alkyl, aryl or aralkyl, in particular methyl, ethyl, n-propyl, isopropyl, n-butyl, isobutyl, tert-butyl or benzyl.

According to a second variant of the invention, the functional group borne at the chain end by the copolymer of a 1,3-diene and of an olefin is of formula —$CH_2$—$CH(CH_3)$—COOZ, Z being a hydrocarbon group substituted by an amine, alkoxysilane, silanol, ether, alcohol, thioether or thiol function, preferably by an amine, alkoxysilane, silanol or ether function. According to this variant, the hydrocarbon group substituted by said function is an alkyl substituted by said function, more preferentially an alkyl substituted by said function and having from 1 to 3 atoms.

According to a first embodiment of the second variant, Z represents an alkyl substituted by a dialkylamino group; in particular, Z represents an N,N-di($C_1$-$C_3$)alkylamino($C_1$-$C_3$)alkyl, such as 2-(dimethylamino)ethyl, 2-(diethylamino)ethyl or 2-(diisopropylamino)ethyl.

According to a second embodiment of the second variant, Z represents an alkyl substituted by an alkoxydialkylsilyl group, in particular a ($C_1$-$C_2$)alkoxydi($C_1$-$C_2$)alkylsilyl group, such as methoxydimethylsilyl, methoxydiethylsilyl, ethoxydimethylsilyl or ethoxydiethylsilyl, by a dialkoxyalkylsilyl group, in particular a di($C_1$-$C_2$)alkoxy($C_1$-$C_2$)alkylsilyl group, such as dimethoxymethylsilyl, diethoxymethylsilyl, dimethoxyethylsilyl or diethoxyethylsilyl, or by a trialkoxysilyl group, in particular a tri($C_1$-$C_2$)alkoxysilyl group, such as trimethoxysilyl or triethoxysilyl. According to this second embodiment, Z preferentially represents a ($C_1$-$C_2$)alkoxydi($C_1$-$C_2$)alkylsilyl($C_1$-$C_3$)alkyl, such as methoxydimethylsilylpropyl or ethoxydimethylsilylpropyl, a di($C_1$-$C_2$)alkoxy($C_1$-$C_2$)alkylsilyl($C_1$-$C_3$)alkyl, such as dimethoxymethylsilylmethyl or diethoxymethylsilylpropyl, or a tri($C_1$-$C_2$)alkoxysilyl($C_1$-$C_3$)alkyl, such as trimethoxysilylmethyl or 3-trimethoxysilylpropyl.

According to a third embodiment of the second variant, Z represents an alkyl substituted by a hydroxydialkylsilyl group, in particular a hydroxydi ($C_1$-$C_2$)alkylsilyl group, such as hydroxydimethylsilyl or hydroxydiethylsilyl, or by a dihydroxyalkylsilyl group, in particular a dihydroxy($C_1$-$C_2$)alkylsilyl group, such as dihydroxymethylsilyl or dihydroxyethylsilyl. According to this third embodiment, Z preferentially represents a hydroxydi($C_1$-$C_2$)alkylsilyl($C_1$-$C_3$)alkyl, such as hydroxydimethylsilylpropyl.

According to a fourth embodiment of the second variant, Z represents an alkyl substituted by an ether function, in particular is 2-ethoxyethyl, ethylene glycol methyl ether, diethylene glycol butyl ether, diethylene glycol methyl ether, furfuryl or tetrahydrofurfuryl.

According to a fifth embodiment of the second variant, Z represents an alkyl substituted by a thioether function and is preferentially alkylthioalkyl, such as 2-(methylthio)ethyl.

According to a sixth embodiment of the second variant, Z is an alkyl substituted by a protected amine function, namely a protected primary or secondary amine function, for example protected by trialkylsilyl groups, in particular trimethylsilyl groups.

According to a seventh embodiment of the second variant, Z is an alkyl substituted by a primary or secondary amine function.

According to an eighth embodiment of the second variant, Z is an alkyl substituted by a protected thiol function, for example protected by trialkylsilyl groups, in particular trimethylsilyl groups.

According to a ninth embodiment of the second variant, Z is an alkyl substituted by a thiol function.

Preferably, the copolymer in accordance with the invention bears, at the chain end, a functional group of formula —$CH_2$—$CH(CH_3)$—COOZ, Z being a hydrocarbon group substituted by an alkoxysilane or silanol function. This is why the second embodiment of the second variant and the third embodiment of the second variant are very particularly preferred.

The copolymer according to the first variant can be prepared by the first alternative of the process involving a non-functional methacrylate and, if appropriate, comprising a hydrolysis reaction of the ester function to give a carboxylic acid function, as described in the specific embodiments of the process.

With regard to the copolymer according to the second variant, it can be prepared according to the second alternative of the process involving a functional methacrylate, more particularly by the implementation of one of the six embodiments described of this second alternative according to the nature of the function of the methacrylate. The process comprises, if appropriate, a hydrolysis reaction of the function of the methacrylate chosen from the modes of hydrolysis which are described according to the nature of the function to be hydrolysed.

To sum up, the invention is advantageously implemented according to any one of the following embodiments 1 to 56:

Embodiment 1: Process for the preparation of a copolymer of a 1,3-diene and of an olefin bearing, at one of its chain ends, a functional group of formula —$CH_2$—$CH(CH_3)$—COOZ, Z being a hydrogen atom or a carbon-comprising group, which process comprises the successive stages a), b) and c) and, if appropriate, a stage d), stage a) being the polymerization of a monomer mixture containing a 1,3-diene and an olefin in the presence of a catalytic system based at least on a metallocene of formula (Ia) and on an organomagnesium compound $$\{P(Cp^1)(Cp^2)Nd(BH_4)_{(1+y)}—L_y—N_x\} \quad (Ia)$$

$Cp^1$ and $Cp^2$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, Nd denoting a neodymium atom, L representing an alkali metal selected from the group consisting of lithium, sodium and potassium, N representing a molecule of an ether, x, which is or is not an integer, being equal to or greater than 0, y, which is an integer, being equal to or greater than 0, the olefin being ethylene or a mixture of ethylene and of an α-monoolefin, stage b) being the reaction of a methacrylate with the reaction product of the polymerization of stage a), stage c) being a chain termination reaction, stage d) being a hydrolysis reaction.

Embodiment 2: Process according to Embodiment 1, in which the methacrylate is a methacrylate of formula $CH_2{=}CCH_3COOR$, R being a hydrocarbon group.

Embodiment 3: Process according to Embodiment 2, in which the hydrocarbon group of the symbol R contains from 1 to 8 carbon atoms.

Embodiment 4: Process according to Embodiment 2 or 3, in which the hydrocarbon group of the symbol R is an alkyl.

Embodiment 5: Process according to any one of Embodiments 2 to 4, in which stage d) is a hydrolysis reaction of the ester function of the functional group to give a carboxylic acid.

Embodiment 6: Process according to Embodiment 1, in which the methacrylate is a methacrylate of formula $CH_2{=}CCH_3COOR'$, R' being a hydrocarbon group substituted by a tertiary amine function, an alkoxysilane function, an ether function, a thioether function, a protected amine function or a protected thiol function.

Embodiment 7: Process according to Embodiment 6, in which R' is a hydrocarbon group substituted by a tertiary amine function, an alkoxysilane function or an ether function.

Embodiment 8: Process according to Embodiment 6 or 7, in which the hydrocarbon group of the symbol R' contains from 1 to 3 carbon atoms.

Embodiment 9: Process according to any one of Embodiments 6 to 8, in which the hydrocarbon group of the symbol R' is an alkyl.

Embodiment 10: Process according to any one of Embodiments 6 to 9, in which the methacrylate is of formula $CH_2{=}CCH_3COOR'$ in which R' is an alkyl substituted by a dialkylamino group; preferentially, the methacrylate is an N,N-di($C_1$-$C_3$)alkylamino($C_1$-$C_3$)alkyl methacrylate.

Embodiment 11: Process according to any one of Embodiments 6 to 9, in which the methacrylate is of formula $CH_2{=}CCH_3COOR'$ in which R' is an alkyl substituted by an alkoxydialkylsilyl group; preferentially, the methacrylate is a ($C_1$-$C_2$)alkoxydi($C_1$-$C_2$)alkylsilyl($C_1$-$C_3$)alkyl methacrylate.

Embodiment 12: Process according to any one of Embodiments 6 to 9, in which the methacrylate is of formula $CH_2{=}CCH_3COOR'$ in which R' is an alkyl substituted by a dialkoxyalkylsilyl group; preferentially, the methacrylate is a di($C_1$-$C_2$)alkoxy($C_1$-$C_2$)alkylsilyl($C_1$-$C_3$)alkyl methacrylate.

Embodiment 13: Process according to any one of Embodiments 6 to 9, in which the methacrylate is of formula $CH_2{=}CCH_3COOR'$ in which R' is an alkyl substituted by a trialkoxysilyl group; preferentially, the methacrylate is a tri($C_1$-$C_2$)alkoxysilyl($C_1$-$C_3$)alkyl methacrylate.

Embodiment 14: Process according to any one of Embodiments 6 to 9, in which the methacrylate is of formula $CH_2{=}CCH_3COOR'$ in which R' is an alkyl group substituted by an ether function; preferentially, the methacrylate is a furfuryl methacrylate.

Embodiment 15: Process according to any one of Embodiments 6 to 14, in which stage d) is a hydrolysis reaction of the function by which the hydrocarbon group of R' is substituted.

Embodiment 16: Process according to Embodiment 15, in which stage d) is a hydrolysis reaction of the alkoxysilane function by which the hydrocarbon group of R' is substituted to give a silanol function.

Embodiment 17: Process according to any one of Embodiments 1 to 16, in which stage b) is carried out with a molar ratio of the number of moles of the methacrylate to the number of moles of neodymium and of magnesium of greater than 2.

Embodiment 18: Process according to any one of Embodiments 1 to 17, in which stage b) is carried out in an aliphatic hydrocarbon solvent.

Embodiment 19: Process according to any one of Embodiments 1 to 18, in which $Cp^1$ and $Cp^2$, which are identical or different, are selected from the group consisting of substituted fluorenyl groups and the unsubstituted fluorenyl group of formula $C_{13}H_9$.

Embodiment 20: Process according to any one of Embodiments 1 to 19, in which $Cp^1$ and $Cp^2$ are identical and each represent an unsubstituted fluorenyl group of formula $C_{13}H_9$.

Embodiment 21: Process according to any one of Embodiments 1 to 20, in which the bridge P connecting the groups $Cp^1$ and $Cp^2$ is of formula $ZR^1R^2$, in which Z represents a silicon or carbon atom and $R^1$ and $R^2$, which are identical or different, each represent an alkyl group comprising from 1 to 20 carbon atoms.

Embodiment 22: Process according to any one of Embodiments 1 to 21, in which the metallocene is of formula (I-1), (I-2), (I-3), (I-4) or (I-5):

$$[Me_2Si(Flu)_2Nd(\mu\text{-}BH_4)_2Li(THF)] \quad \text{(I-1)}$$

$$[\{Me_2SiFlu_2Nd(\mu\text{-}BH_4)_2Li(THF)\}_2] \quad \text{(I-2)}$$

$$[Me_2SiFlu_2Nd(\mu\text{-}BH_4)_2Li(THF)] \quad \text{(I-3)}$$

$$[\{Me_2SiFlu_2Nd(\mu\text{-}BH_4)_2Li(THF)\}_2] \quad \text{(I-4)}$$

$$[Me_2SiFlu_2Nd(\mu\text{-}BH_4)] \quad \text{(I-5)}$$

in which Flu represents the $C_{13}H_9$ group.

Embodiment 23: Process according to any one of Embodiments 1 to 22, in which the organomagnesium compound is of formula (IIa), (IIb), (IIc) or (IId) in which $R^3$, $R^4$, $R^5$ and $R^B$, which are identical or different, represent a carbon-comprising group, $R^A$ represents a divalent carbon-comprising group, X is a halogen atom and m is a number greater than or equal to 1.

$$MgR^3R^4 \quad \text{(IIa)}$$

$$XMgR^5 \quad \text{(IIb)}$$

$$R^B—(Mg—R^A)_m—Mg—R^B \quad \text{(IIc)}$$

$$X—Mg—R^A—Mg—X. \quad \text{(IId)}$$

Embodiment 24: Process according to Embodiment 23, in which $R^A$ is an alkanediyl having from 3 to 10 carbon atoms.

Embodiment 25: Process according to Embodiment 23, in which $R^3$ comprises a benzene nucleus substituted by a magnesium atom, one of the carbon atoms of the benzene nucleus ortho to the magnesium being substituted by a methyl, an ethyl or an isopropyl or forming a ring with the carbon atom which is its closest neighbour and which is meta to the magnesium, the other carbon atom of the benzene nucleus ortho to the magnesium being substituted by a methyl, an ethyl or an isopropyl, and $R^4$ is an alkyl.

Embodiment 26: Process according to Embodiment 23, in which $R^3$ and $R^4$ are alkyls containing from 2 to 10 carbon atoms.

Embodiment 27: Process according to Embodiment 23, in which $R^5$ is an alkyl containing from 2 to 10 carbon atoms.

Embodiment 28: Process according to Embodiment 23 or 24, in which $R^B$ comprises a benzene nucleus substituted by a magnesium atom, one of the carbon atoms of the benzene nucleus ortho to the magnesium being substituted by a methyl, an ethyl or an isopropyl or forming a ring with the carbon atom which is its closest neighbour and which is meta to the magnesium, the other carbon atom of the benzene nucleus ortho to the magnesium being substituted by a methyl, an ethyl or an isopropyl.

Embodiment 29: Process according to Embodiment 23 or 24 or 27, in which X is a bromine or chlorine atom.

Embodiment 30: Process according to any one of Embodiments 1 to 29, in which the ratio of the number of moles of Mg of the co-catalyst to the number of moles of the rare earth metal of the metallocene, neodymium, ranges from 0.5 to 200.

Embodiment 31: Process according to any one of Embodiments 1 to 30, in which the ratio of the number of moles of Mg of the co-catalyst to the number of moles of the rare earth metal of the metallocene, neodymium, ranges from 1 to less than 20.

Embodiment 32: Process according to any one of Embodiments 1 to 31, in which the monomer mixture of stage a) contains more than 50 mol % of ethylene, the percentage being expressed with respect to the total number of moles of monomers of the monomer mixture of stage a).

Embodiment 33: Process according to any one of Embodiments 1 to 32, in which the 1,3-diene contains from 4 to 20 carbon atoms.

Embodiment 34: Process according to any one of Embodiments 1 to 33, in which the 1,3-diene is 1,3-butadiene, isoprene, myrcene, β-farnesene or their mixtures.

Embodiment 35: Process according to any one of Embodiments 1 to 34, in which the copolymer of a 1,3-diene and of an olefin is a copolymer of ethylene and of a 1,3-diene or a copolymer of ethylene, of a 1,3-diene and of styrene.

Embodiment 36: Process according to any one of Embodiments 1 to 35, in which the molar ratio of the number of moles of the methacrylate to the number of moles of neodymium and of magnesium is greater than 2.

Embodiment 37: Process according to any one of Embodiments 1 to 36, in which the molar ratio of the number of moles of the methacrylate to the number of moles of neodymium and of magnesium is greater than 5.

Embodiment 38: Process according to any one of Embodiments 1 to 37, in which the molar ratio of the number of moles of the methacrylate to the number of moles of neodymium and of magnesium is of between 10 and 50.

Embodiment 39: Process according to any one of Embodiments 1 to 38, in which, in stage c), a protic compound is brought into contact with the reaction product from stage b).

Embodiment 40: Process according to Embodiment 39, in which the protic compound is an aliphatic or aromatic alcohol.

Embodiment 41: Copolymer of a 1,3-diene and of an olefin bearing, at one of its chain ends, a functional group of formula $-CH_2-CH(CH_3)-COOZ$, Z being a hydrogen atom or a carbon-comprising group, the olefin being ethylene or a mixture of ethylene and of an α-monoolefin.

Embodiment 42: Copolymer according to Embodiment 41, in which the functional group is of formula $-CH_2-CH(CH_3)-COOZ$, Z being a hydrogen atom or a hydrocarbon group.

Embodiment 43: Copolymer according to Embodiment 41, in which the functional group is of formula $-CH_2-CH(CH_3)-COOZ$, Z being a hydrocarbon group substituted by an amine, alkoxysilane, silanol, ether, alcohol, thioether or thiol function.

Embodiment 44: Copolymer according to Embodiment 43, in which Z is a hydrocarbon group substituted by an amine, alkoxysilane, silanol or ether function.

Embodiment 45: Copolymer according to Embodiment 43 or 44, in which the hydrocarbon group substituted by said function is an alkyl substituted by said function.

Embodiment 46: Copolymer according to any one of Embodiments 43 to 45, in which the hydrocarbon group substituted by said function is an alkyl substituted by said function and having from 1 to 3 carbon atoms.

Embodiment 47: Copolymer according to any one of Embodiments 43 to 46, in which Z represents an N,N-di$(C_1\text{-}C_3)$alkylamino$(C_1\text{-}C_3)$alkyl.

Embodiment 48: Copolymer according to any one of Embodiments 43 to 46, in which Z is a hydrocarbon group substituted by an alkoxysilane or silanol function.

Embodiment 49: Copolymer according to Embodiment 48, in which Z represents a $(C_1\text{-}C_2)$alkoxydi$(C_1\text{-}C_2)$alkylsilyl$(C_1\text{-}C_3)$alkyl, a di$(C_1\text{-}C_2)$alkoxy$(C_1\text{-}C_2)$alkylsilyl$(C_1\text{-}C_3)$alkyl or a tri$(C_1\text{-}C_2)$alkoxysilyl$(C_1\text{-}C_3)$alkyl.

Embodiment 50: Copolymer according to Embodiment 48, in which Z represents a hydroxydi$(C_1\text{-}C_2)$alkylsilyl$(C_1\text{-}C_3)$alkyl.

Embodiment 51: Copolymer according to any one of Embodiments 41 to 50, which copolymer is a statistical copolymer of the 1,3-diene and of the olefin.

Embodiment 52: Copolymer according to any one of Embodiments 41 to 51, in which the α-monoolefin is styrene.

Embodiment 53: Copolymer according to any one of Embodiments 41 to 52, which copolymer contains more than 50 mol % of ethylene units.

Embodiment 54: Copolymer according to any one of Embodiments 41 to 53, in which the 1,3-diene is 1,3-butadiene, isoprene, myrcene, β-farnesene or their mixtures.

Embodiment 55: Copolymer according to any one of Embodiments 41 to 54, which copolymer contains 1,3-butadiene units and 1,2-cyclohexane units.

Embodiment 56: Copolymer according to Embodiment 55, which copolymer contains at most 15 mol % of 1,2-cyclohexane units, the percentage being expressed with respect to all of the units resulting from the polymerization of the 1,3-diene and of the olefin.

A better understanding of the abovementioned characteristics of the present invention, and also others, will be obtained on reading the following description of implementational examples of the invention, which are given by way of illustration and without limitation.

EXAMPLE

Size Exclusion Chromatography (SEC):

a) Principle of the Measurement:

Size exclusion chromatography or SEC makes it possible to separate macromolecules in solution according to their size through columns filled with a porous gel. The macromolecules are separated according to their hydrodynamic volume, the bulkiest being eluted first.

Combined with 3 detectors (3D), a refractometer, a viscometer and a 90° light scattering detector, SEC makes it possible to learn the distribution of absolute molar masses of a polymer. The various number-average (Mn) and weight-average (Mw) absolute molar masses and the dispersity (D=Mw/Mn) can also be calculated.

b) Preparation of the Polymer:

Each sample is dissolved in tetrahydrofuran at a concentration of approximately 1 g/l. The solution is then filtered through a filter with a porosity of 0.45 μm before injection.

c) 3D SEC Analysis:

To determine the number-average molar mass (Mn) and, if appropriate, the weight-average molar mass (Mw) and the polydispersity index (PI or also denoted D=Mw/Mn) of the polymers, the method below is used.

The number-average molar mass (Mn), the weight-average molar mass (Mw) and the polydispersity index of the polymer (hereinafter sample) are determined in an absolute way by triple detection size exclusion chromatography (SEC). Triple detection size exclusion chromatography exhibits the advantage of measuring average molar masses directly without calibration.

The value of the refractive index increment dn/dc of the solution of the sample is measured in line using the area of the peak detected by the refractometer (RI) of the liquid chromatography equipment. In order to apply this method, it must be verified that 100% of the sample mass is injected and eluted through the column. The area of the RI peak depends on the concentration of the sample, on the constant of the RI detector and on the value of the dn/dc.

In order to determine the average molar masses, use is made of the 1 g/l solution in tetrahydrofuran previously prepared and filtered, which is injected into the chromatographic line. The apparatus used is a Wyatt chromatographic line. The elution solvent is tetrahydrofuran containing 250 ppm of BHT (2,6-di(tert-butyl)-4-hydroxytoluene), the flow rate is 1 $ml\cdot min^{-1}$, the temperature of the system is 35° C. and the analytical time is 60 min. The columns used are a set of three Agilent columns of PL Gel Mixed B LS trade name. The volume injected of the solution of the sample is 100 μl. The detection system is composed of a Wyatt differential viscometer of Viscostar II trade name, of a Wyatt differential refractometer of Optilab T-Rex trade name of wavelength 658 nm and of a Wyatt multi-angle static light scattering detector of wavelength 658 nm and of Dawn Heleos 8+ trade name.

For the calculation of the number-average molar masses and the polydispersity index, the value of the refractive index increment dn/dc of the solution of the sample obtained above is integrated. The software for evaluating the chromatographic data is the Astra system from Wyatt.

Nuclear Magnetic Resonance (NMR):

The functionalization products of the copolymers are characterized by $^{1}H$, $^{13}C$ and $^{29}Si$ NMR spectrometry. The NMR spectra are recorded on a Bruker Avance III 500 MHz spectrometer equipped with a BBFO z-grad 5 mm "broad band" cryoprobe. The quantitative 1H NMR experiment uses a simple 30° pulse sequence and a repetition time of 5 seconds between each acquisition. 64 to 256 accumulations are carried out. The quantitative $^{13}C$ NMR experiment uses a simple 30° pulse sequence with a proton decoupling and a repetition time of 10 seconds between each acquisition. 1024 to 10 240 accumulations are carried out. $1H/1^{3}C$ and $1H/^{29}Si$ two-dimensional experiments are used for the purpose of determining the structure of the functional polymers. The axis of the $^{1}H$ chemical shifts is calibrated with respect to the protonated impurity of the solvent ($CDCl_3$) at $\delta_{1H}$=7.20 ppm. The axis of the $^{13}C$ chemical shifts is calibrated with respect to the signal of the solvent ($CDCl_3$) at $\delta_{13C}$=77 ppm. The axis of the $^{29}Si$ chemical shifts is calibrated with respect to the signal of tetramethylsilane (TMS) at 0 ppm (addition of a few microlitres of TMS to the NMR tube).

The chemical structure of each functional polymer is identified by NMR ($^{1}H$, $1^{3}C$ and $^{29}Si$).

The metallocene $[\{Me_2SiFlu_2Nd(\mu\text{-}BH_4)_2Li(THF)\}]_2$ is prepared according to the procedure described in Patent Application WO 2007/054224.

The butyloctylmagnesium BOMAG (20% in heptane, at 0.88 $mol\cdot l^{-1}$) originates from Chemtura and is stored in a Schlenk tube under an inert atmosphere.

The ethylene, of N35 grade, originates from Air Liquide and is used without prepurification.

The 1,3-butadiene and the myrcene are purified over alumina guards.

The functionalization agents used are methyl methacrylate (MMA), 2-(dimethylamino)ethyl methacrylate (DMAEMA), furfuryl methacrylate (FurMA), 3-(trimethoxysilyl)propyl methacrylate (TMSiPMA) sourced from Sigma-Aldrich and 3-(dimethoxymethylsilyl)propyl methacrylate (DMMSiPMA) sourced from ABCR.

The methacrylates and acrylates, which are all commercially available, are used after purification over alumina guards and after sparging with nitrogen.

The methylcyclohexane (MCH) solvent originating from BioSolve is dried and purified on an alumina column in a solvent purifier originating from mBraun and used under an inert atmosphere.

All the reactions are carried out under an inert atmosphere.

Examples 1 to 6: Synthesis of Copolymers of Ethylene and of 1,3-Butadiene Having 80 Mol % of Ethylene and 20 Mol % of 1,3-Butadiene The catalytic systems are prepared according to the process disclosed in Patent Application WO 2007/054224 and described below.

All the polymerizations and the functionalization reactions of copolymers of ethylene and of 1,3-butadiene are carried out in a reactor having a disposable 500 ml glass vessel (Schott flasks) equipped with a stainless-steel stirring blade. The temperature is controlled by virtue of a thermostatically controlled oil bath connected to a polycarbonate jacket. This reactor has all the inlets or outlets necessary for the handling operations.

The co-catalyst and then the metallocene are added to a 500 ml glass reactor containing MCH. The amount of metallocene introduced is 40 mg, and the ratio of the number of moles of Mg of the co-catalyst to the number of moles of Nd of the metallocene is 4.5. The activation time is 10 minutes and the reaction temperature is 20° C.

The polymerization is carried out at 80° C. and at an initial pressure of 4 bar absolute in the 500 ml glass reactor containing 300 ml of polymerization solvent, methylcyclohexane, and the catalytic system. The 1,3-butadiene and the ethylene are introduced in the form of a gas mixture containing 20 mol % of 1,3-butadiene. The polymerization reaction is halted by cooling and degassing the reactor. The copolymer is recovered by precipitation from methanol and then dried.

At the desired conversion, i.e. after the formation of 12 to 13 g of polymer, the reactor is degassed and then a functionalization agent is added in order to carry out the functionalization reaction according to the procedure described.

Procedure of the Functionalization Reaction:

When the desired conversion of monomers is reached, the contents of the reactor are degassed and then the functionalization agent, a methacrylate or an acrylate, is introduced under an inert atmosphere by excess pressure according to a number of equivalents which is equal to the ratio of the number of moles of functionalization agent to the total number of moles of magnesium and neodymium. The reaction medium is stirred at 80° C. for 15 to 60 minutes, then degassed. Unless otherwise indicated, the reaction medium is subsequently precipitated from methanol. The polymer is redissolved in toluene and then precipitated from methanol. The polymer is dried at 60° C. under vacuum to constant weight. It is subsequently analysed by SEC (THF) and $^{1}H$, $^{13}C$ and $^{29}Si$ NMR. In Example 1, the functionalization reaction is followed by the addition of deuterated methanol (1 ml, MeOD) before precipitation of the polymer from methanol.

The conditions of the functionalization reaction which are specific to each example, and also the characteristics of the copolymers, appear in Table 1.

Examples 7 to 10: Synthesis of Copolymers of Ethylene and of Myrcene Having 80 Mol % of Ethylene and 20 Mol % of Myrcene The catalytic system is a preformed catalytic system. It is prepared in methylcyclohexane from the metallocene, $[Me_2Si(Flu)_2Nd(\mu\text{-}BH_4)_2Li(THF)]$, the co-catalyst, butyloctylmagnesium (BOMAG), and a preformation monomer, 1,3-butadiene. It is prepared according to a preparation method in accordance with section 11.1 of Patent Application WO 2017/093654 A1.

5.7 ml of a solution of butyloctylmagnesium in heptane (0.88 M, 5.0 mmol) and 1.462 g of the complex $\{(Me_2Si(C_{13}H_9)_2)Nd(\mu\text{-}BH_4)_2Li(THF)\}_2$ (number of moles of Nd, nNd=2.3 mmol), prepared according to Patent Application WO 2007/054224 (Complex 1), are successively introduced into a 500 ml steinie bottle containing 380 ml of methylcyclohexane degassed beforehand with nitrogen. 17 ml of 1,3-butadiene (also denoted butadiene hereinafter) are added to the steinie bottle at 17° C. The contents of the steinie bottle are then brought to 80° C. for 4 h with stirring. The resulting catalyst solution is stored in a freezer at −25° C.

The polymerization reaction is carried out in a steinie bottle according to the following procedure:

The following are introduced at 23° C. into a 250 ml steinie bottle:

100 ml of methylcyclohexane sparged beforehand with nitrogen 1 g of myrcene purified beforehand on an alumina column 1 g of ethylene with the help of a 5.5 litre ballast at a pressure of 6 bar absolute 6.5 ml of a solution of BOMAG in MCH at 0.097 mol/l 0.11 ml of the preformed catalytic system at a concentration of 0.006 mol/l.

The steinie bottle is subsequently immersed in a bath thermostatically controlled at 80° C. for 60 min before the functionalization stage carried out according to the procedure described for Examples 2 to 6, apart from the difference that the steinie bottle is used instead of the reactor.

The conditions of the functionalization reaction which are specific to each example, and also the characteristics of the copolymers, appear in Table 2. The NMR analyses show a degree of functionalization of greater than 80%.

Examples 11 to 13: Synthesis of Copolymers of Ethylene, of 1,3-Butadiene and of Myrcene Having 70 Mol % of Ethylene, 15 Mol % of 1,3-Butadiene and 15 Mol % of Myrcene 64 litres of MCH and the co-catalyst (15 and 1500 mmol) are introduced into an 80 litre stainless steel reactor. The reactor is heated to 80° C. and the monomers are added at a controlled rate in order to keep the composition of the monomer mixture constant in the polymerization medium. The ethylene flow rate is set at 40 g/min, the myrcene and the butadiene are injected independently and are under the control of the ethylene flow rate according to the myrcene/ethylene ratio by weight equal to 1.54 and according to the butadiene/ethylene ratio by weight equal to 0.24. When the reactor reaches the pressure of 8 bar, 950 ml of the preformed catalytic system at a concentration of 0.007 mol/1 prepared according to the preceding protocol are introduced into the polymerization medium. The polymerization reaction carried out at 80° C. is halted when close to 6500 g of polymer have been formed: the polymer is recovered after a stripping stage. The polymer is subsequently dried on a worm machine equipped with a single screw at 150° C.

Unless otherwise indicated, the polymerization is halted by the addition of the functionalization agent at 80° C. after formation of 6300 to 6500 g of polymer.

The conditions of the functionalization reaction which are specific to each example, and also the characteristics of the copolymers, appear in Table 3.

Examples 1 to 3 and 5, in accordance with the invention, show that the use of methyl methacrylate as functionalization agent indeed results in a functionalized polymer being obtained. Example 4 is an example not in accordance with the invention, since the functionalization agent is not a methacrylate but an acrylate, methyl acrylate. Example 4 shows that the functionalization of the polymer does not take place when an acrylate is used instead of a methacrylate.

The other Examples 6 to 13 illustrate the functionalization of the polymers by using methacrylates with a structure different from that of an alkyl methacrylate, in particular by using functional methacrylates.

TABLE 1

| Example | Agent (1) | Molar F. °/(Mg + Nd) equivalent | Time (2) (min) | Mn (g/mol) | Function (mol %) | Degree (3) (%) |
|---|---|---|---|---|---|---|
| 1 | MMA | 39 | 60 | 23 500 | 0.2 | 100 |
| 2 | MMA | 39 | 60 | 39 900 | 0.1 | 100 |
| 3 | MMA | 39 | 5 | 40 700 | 0.1 | 100 |
| 4 | MA | 39 | 60 | 30 000 | 0 | 0 |
| 5 | MMA | 2 | 60 | 24 600 | 0.1 | 64 |
| 6 | DMAEMA | 39 | 60 | 68 600 | 0.06 | 100 |

(1): Functionalization agent
(2): Functionalization time
(3): Degree of functionalization

TABLE 2

| Example | Agent (1) | Molar F. °/(Mg + Nd) equivalent | Time (2) (min) | Mn (g/mol) |
|---|---|---|---|---|
| 7 | MMA | 39 | 60 | 2927 |
| 8 | DMAEMA | 39 | 60 | 4082 |
| 9 | FurMA | 39 | 5 | 2909 |
| 10 | TMSiPMA | 39 | 60 | 2449 |

(1) Functionalization agent
(2) Functionalization time

TABLE 3

| Example | Agent (1) | Molar F. °/(Mg + Nd) equivalent | Time (2) (min) | Mn (g/mol) |
|---|---|---|---|---|
| 11 | TMSiPMA | 39 | 15 | 143 500 |
| 12 | DMAEMA | 39 | 15 | 169 300 |
| 13 | DMMSiPMA | 39 | 15 | 150 700 |

(1) Functionalization agent
(2) Functionalization time

What is claimed is:

1. A process for the preparation of a copolymer of a 1,3-diene and of an olefin, the copolymer bearing, at one of its chain ends, a functional group of formula $—CH_2—CH(CH_3)—COOZ$, Z being a hydrogen atom or a carbon-comprising group, which process comprises the successive stages a), b) and c) and, optionally, a stage d), stage a) being the polymerization of a monomer mixture containing a 1,3-diene and an olefin in the presence of a catalytic system based at least on a metallocene of formula (Ia) and on an organomagnesium compound $$\{P(Cp^1)(Cp^2)Nd(BH_4)_{(1+y)}—L_y—N_x\} \quad (Ia)$$

$Cp^1$ and $Cp^2$, which are identical or different, being chosen from the group consisting of fluorenyl groups, cyclopentadienyl groups and indenyl groups, the groups being substituted or unsubstituted, P being a group bridging the two groups $Cp^1$ and $Cp^2$ and comprising a silicon or carbon atom, Nd denoting a neodymium atom, L representing an alkali metal selected from the group consisting of lithium, sodium and potassium, N representing a molecule of an ether, x, which is or is not an integer, being equal to or greater than 0, y, which is an integer, being equal to or greater than 0, the olefin being ethylene or a mixture of ethylene and of an α-monoolefin, stage b) being the reaction of a methacrylate with the reaction product of the polymerization of stage a), stage c) being a chain termination reaction, and stage d) being a hydrolysis reaction.

2. The process according to claim 1, in which the methacrylate is a methacrylate of formula $CH_2═CCH_3COOR$, R being a hydrocarbon group.

3. The process according to claim 1, in which the methacrylate is a methacrylate of formula $CH_2═CCH_3COOR'$, R' being a hydrocarbon group substituted by a tertiary amine function, an alkoxysilane function, an ether function, a thioether function, a protected amine function or a protected thiol function.

4. The process according to claim 2 in which stage d) is a hydrolysis reaction of the ester function of the functional group or of the function by which the hydrocarbon group of R' is substituted.

5. The process according to claim 1, in which stage b) is carried out with a molar ratio of the number of moles of the methacrylate to the number of moles of neodymium and of magnesium of greater than 2.

6. The process according to claim 1, in which stage b) is carried out in an aliphatic hydrocarbon solvent.

7. The process according to claim 1, in which the copolymer of a 1,3-diene and of an olefin is a copolymer of ethylene and of a 1,3-diene or a copolymer of ethylene, of a 1,3-diene and of styrene.

8. A copolymer of a 1,3-diene and of an olefin, which copolymer bears, at one of its chain ends, a functional group of formula $—CH_2—CH(CH_3)—COOZ$, Z being a hydrogen atom or a carbon-comprising group, the olefin being ethylene or a mixture of ethylene and of an α-monoolefin.

9. The copolymer according to claim 8, in which the functional group is of formula $—CH_2—CH(CH_3)—COOZ$, Z being a hydrogen atom or a hydrocarbon group.

10. The copolymer according to claim 8, in which the functional group is of formula $—CH_2—CH(CH_3)—COOZ$, Z being a hydrocarbon group substituted by an amine, alkoxysilane, silanol, ether, alcohol, thioether or thiol function.

11. The copolymer according to claim 10, in which Z is a hydrocarbon group substituted by an alkoxysilane or silanol function.

12. The copolymer according to claim 8, which copolymer is a statistical copolymer of the 1,3-diene and of the olefin.

13. The copolymer according to claim 8, which copolymer contains more than 50 mol % of ethylene units.

14. The copolymer according to claim 8, in which the 1,3-diene is 1,3-butadiene, isoprene, myrcene, β-farnesene or their mixtures.

15. The copolymer according to claim 8, which copolymer contains 1,3-butadiene units and 1,2-cyclohexane units.

* * * * *